(12) United States Patent
Creasy et al.

(10) Patent No.: US 11,946,506 B2
(45) Date of Patent: Apr. 2, 2024

(54) TORQUE TUBE COUPLER

(71) Applicant: ARRAY TECHNOLOGIES, INC., Albuquerque, NM (US)

(72) Inventors: Lucas Creasy, Scottsdale, AZ (US); Nikhil Kumar, Albuquerque, NM (US); James Fusaro, Albuquerque, NM (US); Kenyon Bradley, Albuquerque, NM (US); Daniel Smith, Albuquerque, NM (US)

(73) Assignee: ARRAY TECHNOLOGIES, INC., Alburquerque, NM (US)

( * ) Notice: Subject to any disclaimer, the term of this patent is extended or adjusted under 35 U.S.C. 154(b) by 0 days.

(21) Appl. No.: 18/176,395

(22) Filed: Feb. 28, 2023

(65) Prior Publication Data
US 2023/0213050 A1 Jul. 6, 2023

Related U.S. Application Data

(62) Division of application No. 17/474,148, filed on Sep. 14, 2021, now Pat. No. 11,592,046.
(Continued)

(51) Int. Cl.
*F16B 7/18* (2006.01)
*F16B 7/02* (2006.01)
(Continued)

(52) U.S. Cl.
CPC ............ *F16B 7/182* (2013.01); *F16B 7/025* (2013.01); *F16B 7/042* (2013.01); *F16D 1/0864* (2013.01);
(Continued)

(58) Field of Classification Search
CPC .......... F16B 7/0413; F16B 7/042; F16B 7/18; F16B 7/182; F16B 35/005; F16D 1/04;
(Continued)

(56) References Cited

U.S. PATENT DOCUMENTS 2,997,317 A * 8/1961 Scott ................ F16B 7/0413
403/297
3,514,135 A * 5/1970 Cooper ............ F16B 7/0413
403/297

(Continued)

FOREIGN PATENT DOCUMENTS

CH 707265 A2 * 5/2014 ............. E01F 9/623
DE 2403832 A1 * 8/1975 ........... F16B 7/0413
(Continued)

*Primary Examiner* — Josh Skroupa
(74) *Attorney, Agent, or Firm* — MASCHOFF BRENNAN

(57) ABSTRACT

A torque tube coupler may include an outer body that includes a first abutting surface and a second abutting surface adjacent to the first abutting surface. Set screws may be inserted into one or more channels of the first abutting surface. Tightening the set screws may force the abutting surfaces away from each other and the outer body to press against an inner surface of a torque tube. Another embodiment of the torque tube coupler may include a central ring sized based on a size of a torque tube. The torque tube coupler may also include a set of fingers that extend away from a first side of the central ring and are shaped to flex radially outward. The torque tube coupler may include a core disposed within the set of fingers that, when drawn towards the central ring, causes the fingers to flex radially outwards.

9 Claims, 15 Drawing Sheets

Related U.S. Application Data

(60) Provisional application No. 63/078,167, filed on Sep. 14, 2020.

(51) Int. Cl.
*F16B 7/04* (2006.01)
*F16D 1/08* (2006.01)
*H02S 30/00* (2014.01)

(52) U.S. Cl.
CPC ............... *H02S 30/00* (2013.01); *Y02E 10/47* (2013.01); *Y10T 403/7041* (2015.01)

(58) Field of Classification Search
CPC ........ F16D 1/08; F16D 1/0847; F16D 1/0864; Y10T 403/55; Y10T 403/556; Y10T 403/557; Y10T 403/7041; Y10T 403/7043; Y10T 403/7067
USPC ............. 403/292, 296, 297, 362, 363, 374.3
See application file for complete search history.

(56) References Cited

U.S. PATENT DOCUMENTS

| | | | | | |
|---|---|---|---|---|---|
| 3,900,269 | A | * | 8/1975 | Pavlot | F16B 7/0413 403/292 |
| 5,464,299 | A | * | 11/1995 | Scharer | F16B 7/025 403/297 |
| 7,232,234 | B2 | * | 6/2007 | Branham | F16B 7/0413 403/297 |
| 7,618,210 | B2 | * | 11/2009 | Wagner | F16B 7/0413 403/397 |
| 10,072,425 | B1 | * | 9/2018 | Madden | F16B 7/0413 |
| 10,082,167 | B2 | * | 9/2018 | Peverada | F16B 7/0413 |
| 2011/0001315 | A1 | * | 1/2011 | Fischer | F16B 7/0413 285/31 |
| 2017/0317641 | A1 | * | 11/2017 | Rainer | F24S 25/65 |

FOREIGN PATENT DOCUMENTS

| | | | | | |
|---|---|---|---|---|---|
| FR | 1175966 | A | * | 4/1959 | ............ F16B 7/0413 |
| FR | 2468022 | A1 | * | 4/1981 | ............ F16B 7/0413 |
| GB | 591253 | A | * | 8/1947 | ............. F16B 7/025 |
| GB | 2256464 | A | * | 12/1992 | ............ F16B 7/0413 |

* cited by examiner

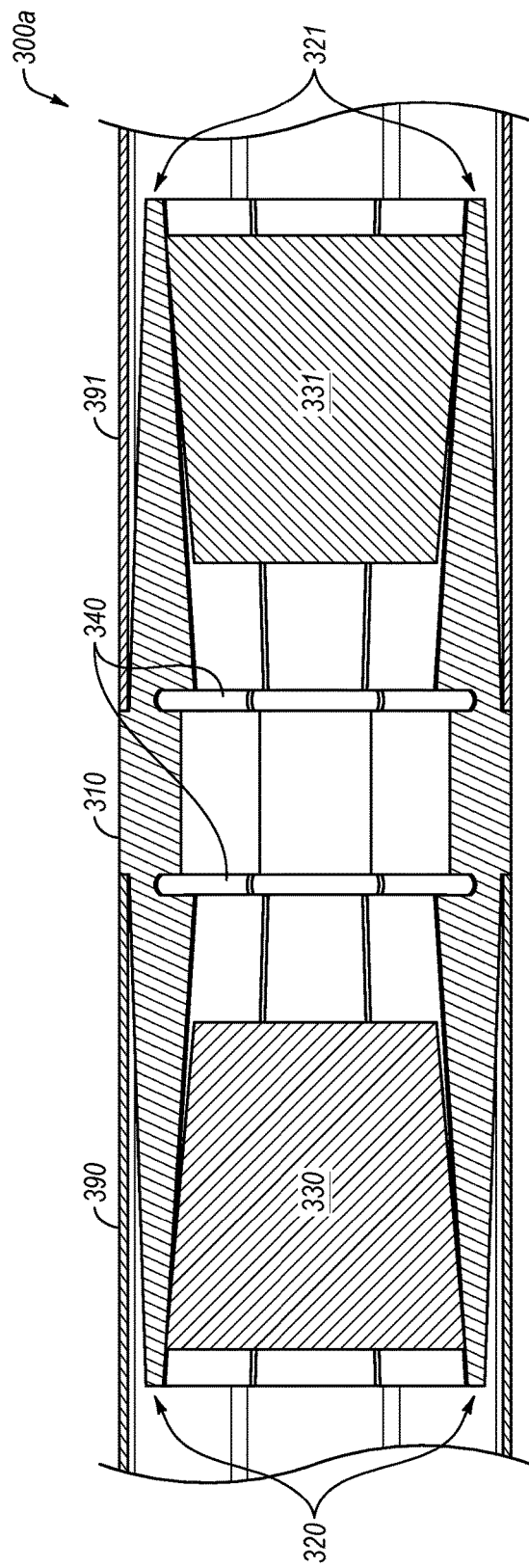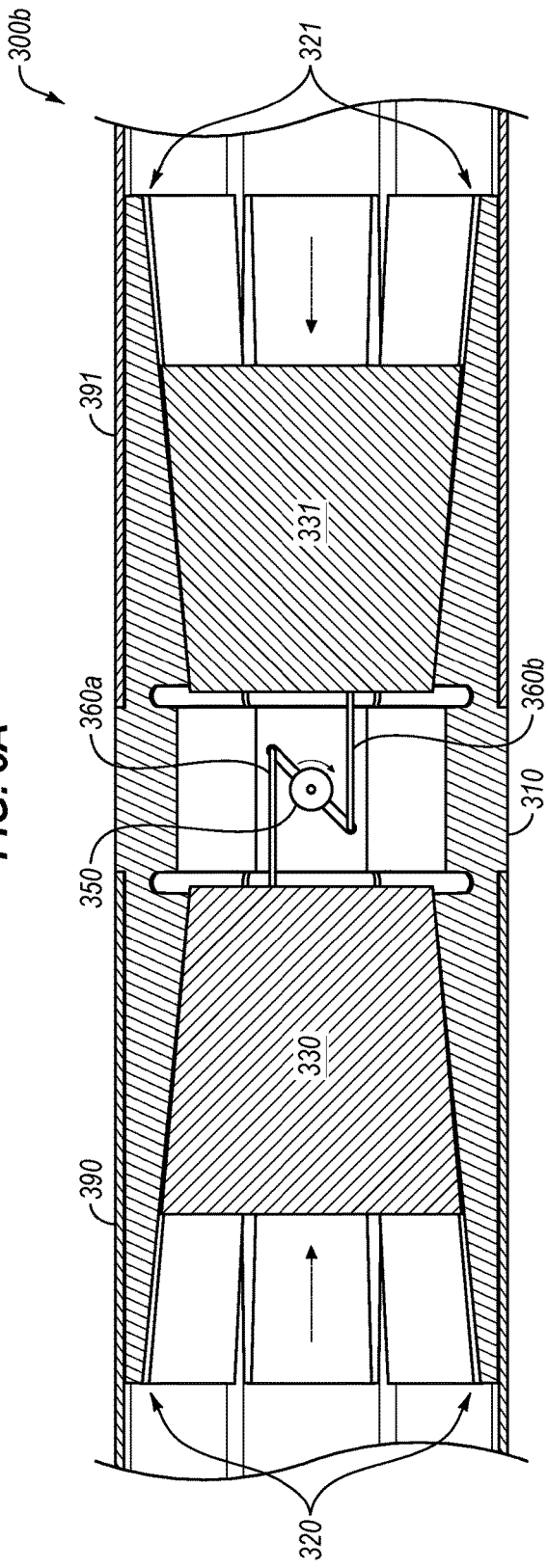

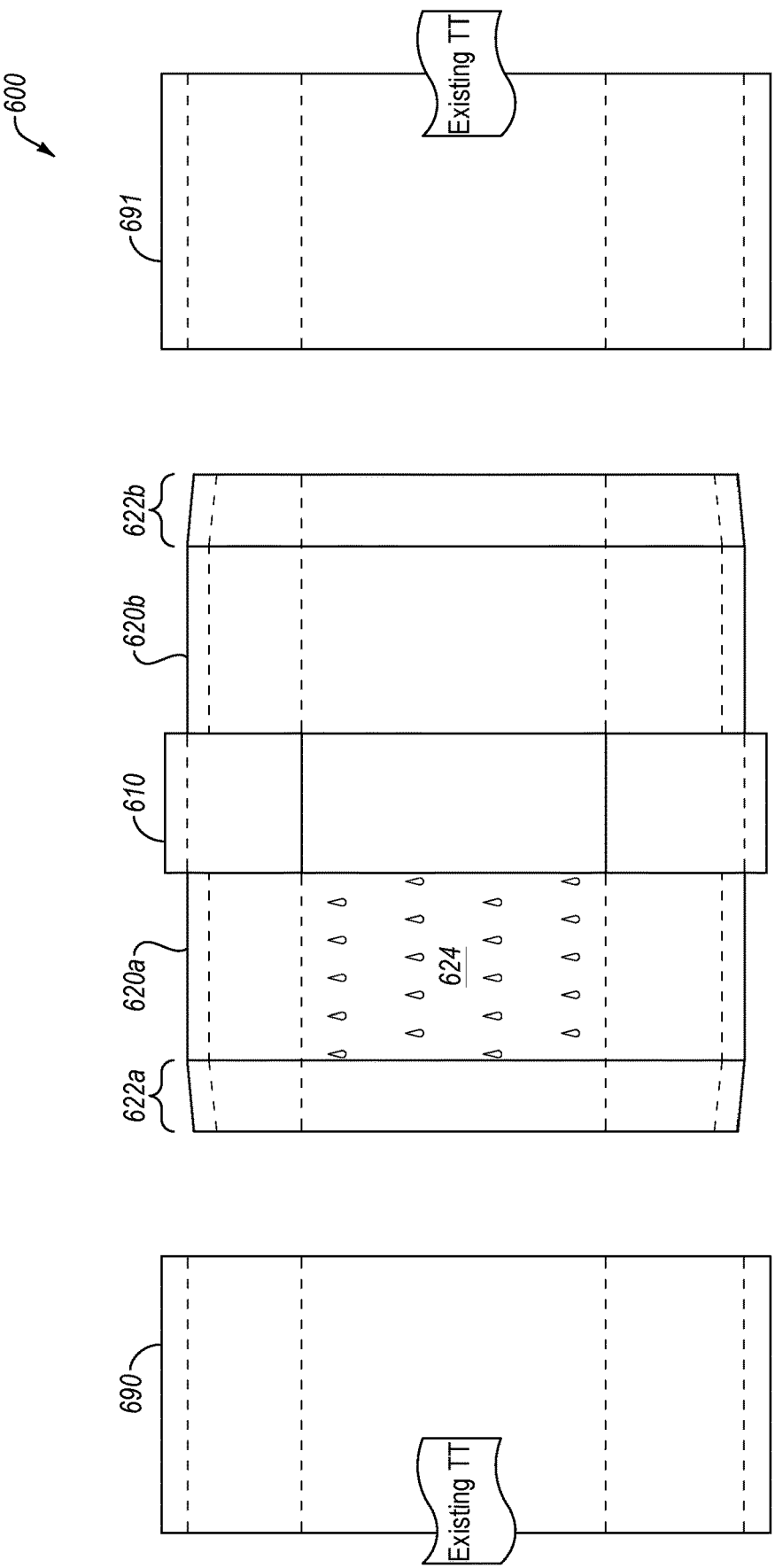

TORQUE TUBE COUPLER

CROSS-REFERENCE TO RELATED APPLICATION

This application is a divisional of U.S. application Ser. No. 17/474,148, filed Sep. 14, 2021, which claims the benefit of and priority to U.S. Patent Application Ser. No. 63/078,167, filed on Sep. 14, 2020; both disclosures of which are incorporated herein by reference in their entirety.

THE FIELD OF THE DISCLOSURE

The present disclosure relates to a torque tube coupler for joining two torque tubes.

BACKGROUND

Most photovoltaic ("PV") modules are quite heavy because they use glass to encase the PV cells. A solar tracking system, therefore, must be able to withstand the weight of an array of one or more PV modules and the forces of nature that may act upon it. In addition to supporting heavy solar arrays and the associated natural forces, solar tracking equipment must also be able to move the solar array so it tracks the sun. This can require motors with © significant power that rotate the torque tubes to which the PV modules are mounted. Such torque tubes often come in segments that are joined to create a full-length torque tube corresponding to the length of the site of the array.

However, when coupling the segments of torque tubes together, the coupling device and/or the hardware used to couple the segments together often extends beyond the outside of the torque tubes, causing a blockage for PV modules and/or other mounting hardware to slide past when installing and/or adjusting an array. Additionally, such devices and/or hardware place constraints on where PV modules can be mounted to the torque tubes, and where those torque tubes can be mounted to support structures.

Accordingly, there is a need for a torque tube coupler that maintains a low profile relative to the profile of the torque tube itself, and potentially fits completely within the torque tube.

The subject matter claimed herein is not limited to embodiments that solve any disadvantages or that operate only in environments such as those described above. Rather, this section is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One embodiment of the present disclosure includes a torque tube coupler that includes an outer body, a first abutting surface coupled to the outer body and including one or more channels, and a second abutting surface adjacent to the first abutting surface. The torque tube coupler includes one or more set screws sized for insertion into the one or more channels of the first abutting surface in which tightening one or more of the set screws may force the first abutting surface away from the second abutting surface to press the outer body against an inner surface of a torque tube.

Another embodiment of the present disclosure includes a torque tube coupler that includes a central ring sized to correspond with an outer dimension of a torque tube. The torque tube coupler also includes a first set of fingers extending away from a first side of the central ring in which each finger of the first set of fingers is attached to the central ring at a middle end and is shaped to flex radially outward at a far end. The torque tube coupler also includes an angled core disposed within the fingers and shaped such that as the angled core is in an outer position, the fingers fit within an inner dimension of the torque tube, and when drawn inwards towards the central ring, the first set of fingers are caused to flex radially outwards away from the core.

Another embodiment of the present disclosure includes a power-generating system that may include multiple photovoltaic modules and a mounting system connecting each of the photovoltaic module. The mounting system may include one or more torque tube segments connected by a torque tube coupler. The torque tube coupler may include an outer body, a first abutting surface coupled to the outer body and including one or more channels, a second abutting surface adjacent to the first abutting surface, and one or more set screws sized for insertion into the one or more channels of the first abutting surface. Tightening one or more of the set screws may force the first abutting surface away from the second abutting surface to press the outer body against an inner surface of a torque tube.

Additional features and advantages of the disclosure will be set forth in the description which follows, and in part will be apparent from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

To further clarify the above and other advantages and features of the present disclosure, a more particular description of the disclosure will be rendered by reference to specific embodiments thereof which are illustrated in the appended drawings. It is appreciated that these drawings depict only typical embodiments of the disclosure and are therefore not to be considered limiting of its scope. The disclosure will be described and explained with additional specificity and detail through the use of the accompanying drawings in which:

FIGS. 3A and 3B illustrate a cut away view of example torque tube couplers;

FIG. 6 illustrates another example embodiment of a torque tube coupler;

Figure 1A:
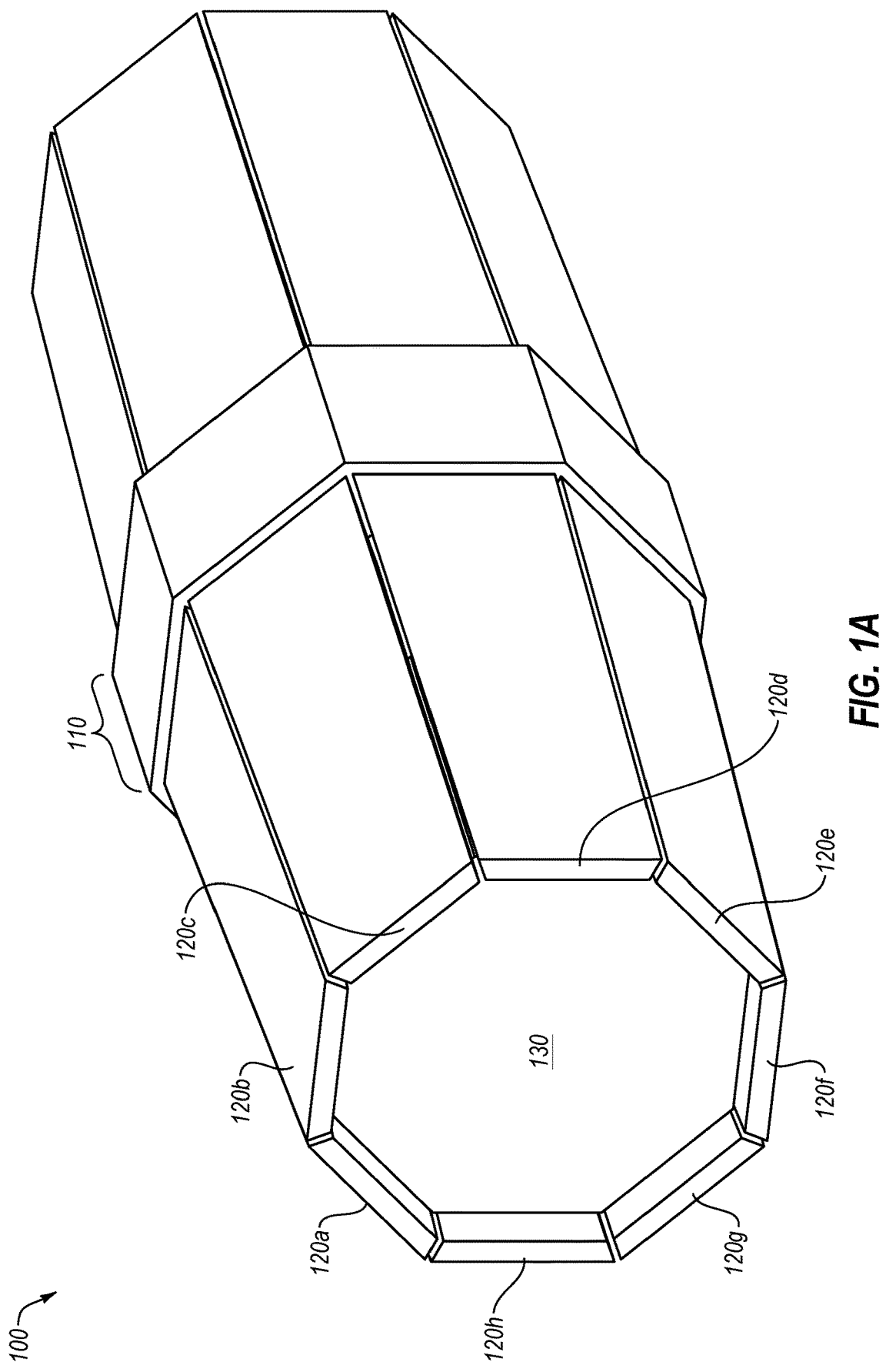
FIGS. 1A and 1B illustrate an example embodiment of a torque tube coupler in accordance with the present disclosure.

All in accordance with one or more embodiments of the present disclosure.

DETAILED DESCRIPTION

Torque tubes often come in segments that are joined to create a full-length torque tube corresponding to the length of the site of the array. However, when coupling the segments of torque tubes together, the coupling device and/or the hardware used to couple the segments together often extends beyond the outside of the torque tubes, causing a blockage for PV modules and/or other mounting hardware to slide past when installing and/or adjusting an array. Additionally, such devices and/or hardware place constraints on where PV modules can be mounted to the torque tubes, and where those torque tubes can be mounted to support structures. Accordingly, there is a need for a torque tube coupler that maintains a low profile relative to the profile of the torque tube itself, and potentially fits completely within the torque tube.

The present disclosure relates to variations in torque tube couplers. When installing and arranging a site for generating solar energy, a string of individual torque tube segments may be fixedly coupled together, and the torque tubes may be mounted to support hardware, such as steel posts protruding from piles or some other support structure. In addition to the connection to the support structures, PV modules are mounted to the torque tubes such that as the torque tubes are rotated, the PV modules are able to change their angle of incidence with the sun. However, when large external hardware is used to couple the torque tube segments together, rigorous planning and careful calculations are performed to be sure that neither the PV coupling hardware nor the torque tube mounting hardware aligns with the hardware for coupling the torque tube segments together. The present disclosure provides a variety of torque tube couplers that attach the torque tube segments to each other with little to no hardware being exposed beyond the profile of the torque tube itself.

One such example includes a torque tube coupler with fingers that extend away from a central region, and an angled core disposed within a region enclosed by the fingers. The fingers are shaped such that they fit and can be slid within a torque tube. The core is then drawn inwards towards the central region, and the fingers are shaped such that they are forced outwards against the inner surface of the torque tube as the core is drawn towards the central region. Forcing the fingers outwards creates greater and greater interference and frictional force with the inside surface of the torque tube, thereby coupling two adjacent torque tube segments together.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as examples, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

Figure 1B:
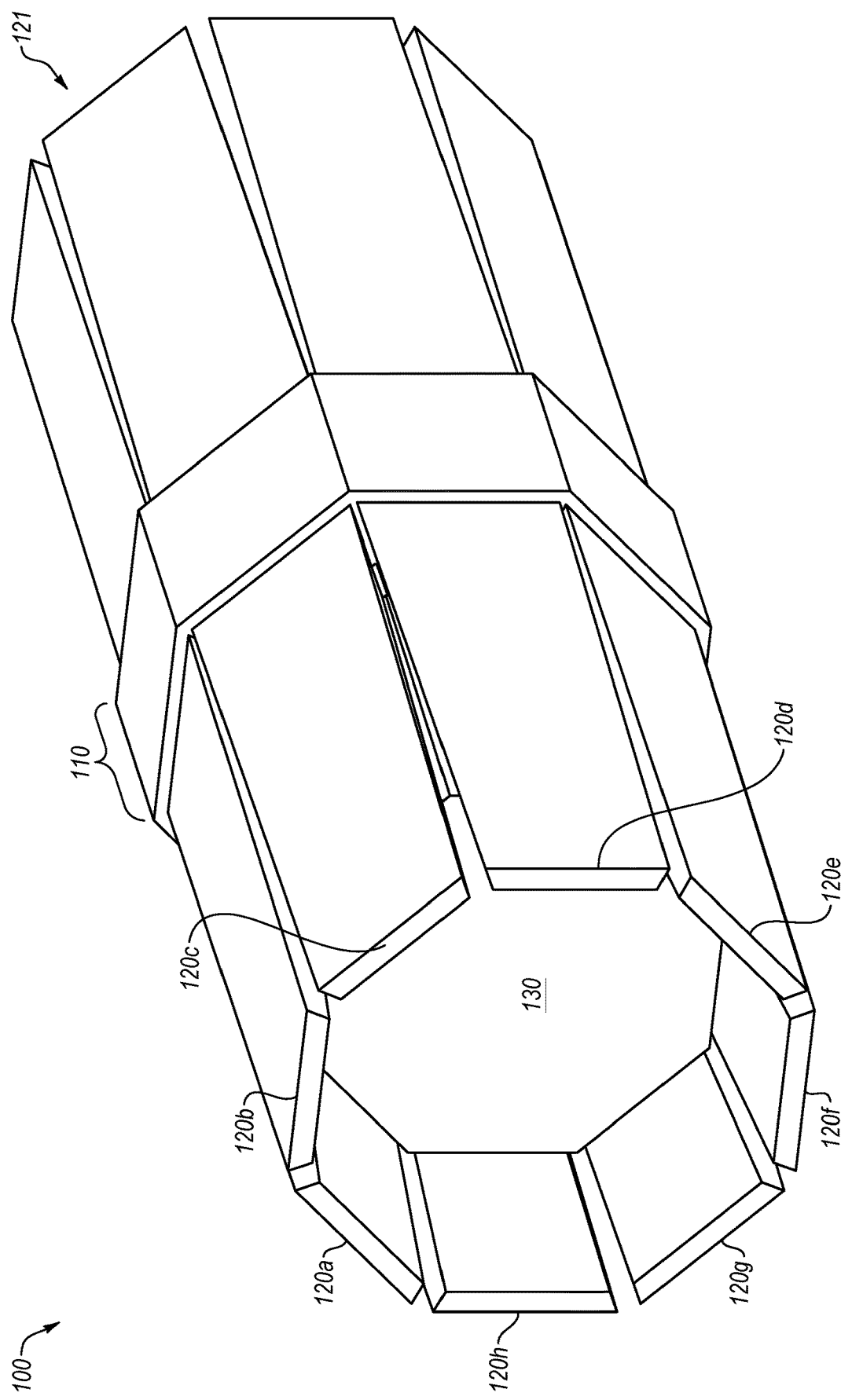

FIGS. 1A and 1B illustrate an example torque tube coupler 100, in accordance with one or more embodiments of the present disclosure. The torque tube coupler 100 may include a central ring 110 with fingers 120 (such as the fingers 120a-h) extending therefrom, and a core 130 disposed within a region defined by the fingers 120. The torque tube coupler 100 may be used to couple octagonal-shaped torque tube segments together.

The central ring 110 may be a solid material that is sized to correspond to the size of an outer dimension of a torque tube. For example, for a circular torque tube, the outer dimension may be the outer diameter, although the torque tube may have any profile, such as octagonal, hexagonal, square, rectangular, etc. The central ring 110 may share a same profile as the torque tube for which the torque tube coupler 100 is coupling, and may be within 1%, 2%, 5%, etc. of the outer dimension of the torque tube. In some embodiments, the central ring 110 may extend slightly beyond the torque tube and may have a lip or gap within which the torque tube fits when fully coupled.

The fingers 120 may be made of a single body with the central ring 110, and/or be fixedly coupled to the central ring 110 at a middle end of the fingers 120. For example, the middle end of the fingers 120 may be the end proximate the central ring 110 and the far end may be the end of the fingers 120 that project away from the central ring 110. The fingers 120 may include a profile that is thicker in material proximate the central ring and less thick in material when progressing from the middle end to the far end. In some embodiments, the fingers 120 may include a cut out or angle to the sides of the fingers such that they are able to be compressed closer together while still maintaining a shape that corresponds with the outer shape of the torque tube. The fingers 120 may be made of a material that may permit a certain amount of flexion radially outward without material failure. For example, the fingers 120 may be configured to flex radially outward 1 degree from horizontal at the far end, 3 degrees from horizontal at the far end, 5 degrees from horizontal at the far end, 10 degrees from horizontal at the far end, 20 degrees from horizontal at the far end, etc. or any other degree of flexion. The degree of flexion may be measured as a line drawn from the tip of the finger 120 at the far end to the base of the finger 120 proximate the central ring 110 and compared to the same line of the finger 120 in an undeployed position. In these and other embodiments, the actual flexion of the fingers 120 may cause the fingers 120 to take a curved shape that may vary based on variations in the thickness, etc. In some embodiments, the relaxed configuration of the fingers 120 may include a slight taper radially inwards when going from the middle end to the far end of the fingers 120.

The torque tube coupler 100 may include a core 130 that may be positioned within a region defined by the fingers 120. The core 130 may be angled in a manner that may correspond or exceed the angle in change in thickness of the fingers such that the far end of the core 130 interfaces with the fingers 120 and the middle end of the core 130 does not. In operation, a mechanism may be used to draw the core 130 from an outer position (shown in FIG. 1A) to an inner position (shown in FIG. 1B) that moves the core 130 in line with a central axis of the torque tube and torque tube coupler 100 inwards towards the central ring 110. As the core 130 is drawn inwards, the core 130 forces the fingers 120 radially outwards from an undeployed position to a deployed position. For example, the torque tube coupler 100 may be disposed with the fingers 120 within a torque tube, with the fingers 120 in an undeployed position. The mechanism to draw the core 130 inwards may be invoked forcing the fingers 120 outwards and against the inner surface of the torque tube and into the deployed position. By doing so, the torque tube coupler 100 may be locked in place relative to the torque tube.

The torque tube coupler 100 may include fingers 121 with a respective core (not illustrated) at an opposite end of the torque tube coupler 100 such that the torque tube coupler 100 may be disposed within two adjacent torque tube segments. The mechanism for drawing the core 130 inwards may draw the core 130 in separately, or may cause both the core 130 of the fingers 120 and the core (not illustrated) of the fingers 121 inwards at the same time.

The mechanism for drawing the core inwards may include any of a variety of mechanisms that will cause the core 130 to be drawn inwards. For example, a bolt may be disposed slightly below the flat face of the central ring and extend into the middle of the central ring 110 and a cord, string, etc. may be coupled between the bolt and the core 130. As the bolt is tightened, the cord may be wrapped around the bolt, drawing the core 130 inwards. As another example, a ratchet mechanism or zip-tie type mechanism may be coupled to the bolt and the core 130 to facilitate drawing the core 130 inwards.

In some embodiments, the outer surface of the fingers 120/121 that interface with a torque tube may include a surface treatment, such as treatment by a roughing agent, to increase the frictional fit between the fingers 120/121 and the inside surface of the torque tube. Additionally or alternatively, features such as barbs may be disposed on the outer surface of the fingers 120/121 to increase the frictional fit between the fingers 120/121 and the inside surface of the torque tube. Additionally or alternatively, the texture of the outer surface of the fingers 120/121 may be made to match that of the inside surface of the torque tubes such that a maximum surface area between the two may be obtained to increase the frictional fit between the fingers 120/121 and the inside surface of the torque tube.

Figure 2B:
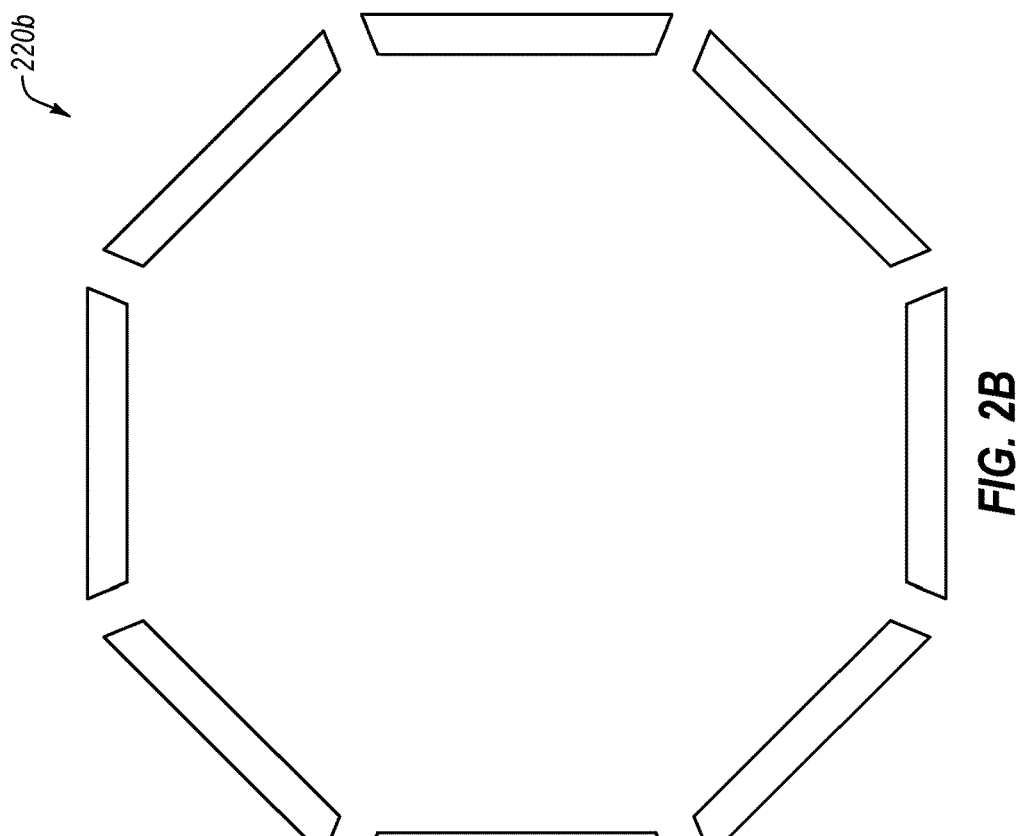
FIGS. 2A and 2B illustrate a front view of fingers of the torque tube coupler of FIGS. 1A and 1B in an undeployed and deployed configuration, respectively.
Figure 2A:
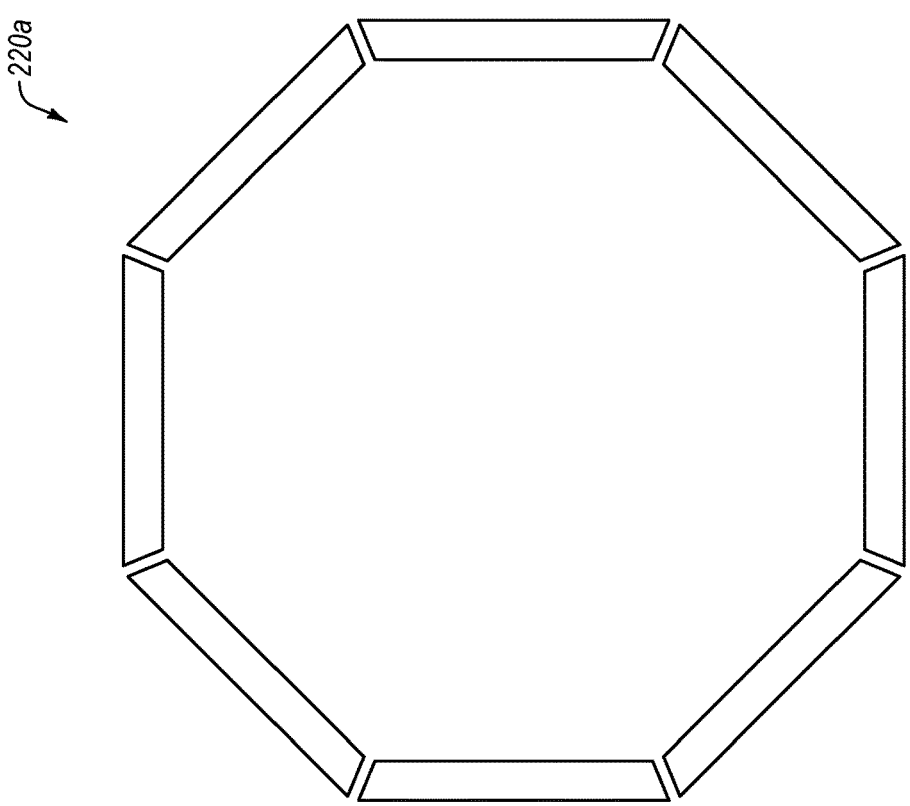

FIGS. 2A and 2B illustrate a front view of fingers 220a/220b of the torque tube coupler of FIGS. 1A and 1B in an undeployed and deployed configuration, respectively. The fingers 220a/220b may correspond to the fingers 120a-h and/or the fingers 121 of FIGS. 1A/1B.

As illustrated in FIG. 2A, the fingers 220a may be in an undeployed position with the fingers 220a close together and an overall outer dimension of the fingers 220a that is smaller than that for the deployed view illustrated in FIG. 2B. While the transition from FIG. 2A to 2B illustrates one example of how far the fingers 220b may flex radially outward, it will be appreciated that the fingers 220b may flex outward in any amount and/or in any shape or profile. Additionally, the illustration of the transition between FIGS. 2A and 2B may be exaggerated to illustrate the principle of transitioning between the undeployed and the deployed position.

FIGS. 3A and 3B illustrate a cut away view of example torque tube couplers 300a/300b, in accordance with one or more embodiments of the present disclosure. The transition between FIGS. 3A and 3B illustrate cores 330/331 transitioning from an undeployed position in FIG. 3A to a deployed position in FIG. 3B within torque tubes 390 and 391. The components of the torque tube couplers 300a and 300b may correspond to similarly numbered components of the torque tube coupler 100 of FIGS. 1A/1B. For example, the torque tube couplers 300a/300b may include a central ring 310 that may be similar or comparable to the central ring 310 of FIGS. 1A/1B, fingers 320/321 that may be similar or comparable to the fingers 120/121 of FIGS. 1A/1B, and/or cores 330/331 that may be similar or comparable to the core 130 of FIGS. 1A/1B.

In some embodiments, the torque tube couplers 300a/300b may include flexion grooves 340. For example, the flexion grooves 340 may represent a void in material that may facilitate the flexion of the fingers 320/321 radially outward by providing a location of decreased material thickness where the torque tube couplers 300a/300b may more readily deform to permit the flexion. In some embodiments, the flexion grooves 340 may be disposed on either and/or both sides of the central ring 310.

As illustrated in FIG. 3A, when in the undeployed position, there is a small gap between the fingers 320/321 and the torque tubes 390/391. Additionally, there may or may not be a small, angled gap between the side face of the cores 330/331 and the inside surface of the fingers 320/321. When in the deployed position illustrated in FIG. 3B, the gap between the inside of the torque tubes 390/391 and the fingers 320/321 has been removed as the fingers 320/321 have been pushed radially outwards and against the inside surface of the torque tubes 390/391. Additionally or alternatively, the gap between the inside surface of the fingers 320/321 and the cores 330/331 has been removed as the cores 330/331 have been forced against the fingers 320/321.

As illustrated in FIG. 3B, in some embodiments, a mechanism may be used to draw the cores 330/331 towards the central ring 310. For example, a threaded bolt 350 or other such device may project from the outer surface of the central ring 310 and into a hollow region within the central ring 310. The threaded bolt may have cords 360 coupling the cores 330/331 to the bolt 350 (such as the cord 360a coupling the core 330 to the bolt 350 and the cord 360b coupling the core 331 to the bolt 350). In some embodiments the cords 360 may be coupled to an arm or extension attached to the bolt 350. In some embodiments, the bolt 350 may have a head that is accessible from outside of the central ring 310. In these and other embodiments, the head may sit near, at, or below an outer surface of the central ring 310.

In operation, as the bolt 350 is tightened, the cords 360a and 360b are wrapped around the bolt 350, pulling the cores 330/331 inwards towards the central ring 310. In some embodiments, each core may have its own respective bolt 350, or a single bolt 350 may operate for both cores 330/331.

In some embodiments, the cords 360 may be constructed of a material and/or material strength to draw the core 330/331 inwards to a desired portion without material failure. In some embodiments, the cords 360 may be designed with a preset tensile strength such that upon pulling the cores 330/331 inwards to a certain point, the cords 360 may experience material failure. The material failure point may correspond to a known and targeted distance of pulling the cores 330/331 inwards. By providing such a feature, installation may be streamlined and made easier as the installer simply turns the bolt until they hear or feel the cords 360 break away, and then the installer knows the bolt 350 has been tightened to the correct tension to lock the torque tube segments 390/391 together using the torque tube coupler 300.

In some embodiments, the cords 360 and/or the bolt 350 may include a one-way ratcheting mechanism or other such feature to prevent the cores 330/331 and/or the cords 360 from slipping backwards. For example, the cords 360 and/or the bolt 350 may include a feature similar to a zip-tie such that as the cords 360 are drawn inwards, they are prevented from slipping back outwards.

Figure 4A:
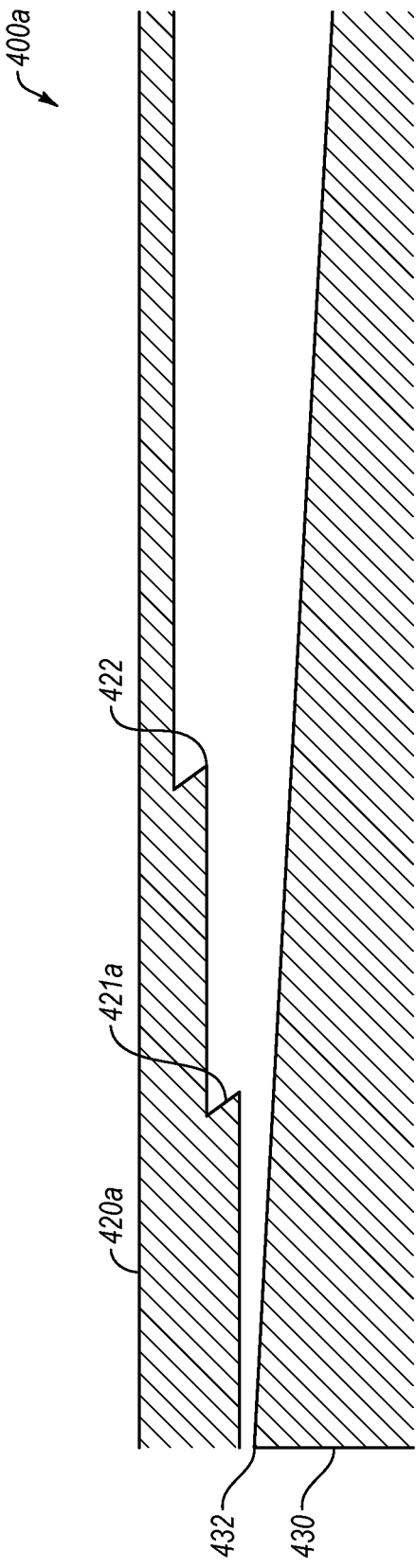
FIGS. 4A and 4B illustrate a cut away view of fingers and a core of an example torque tube coupler.
Figure 4B:
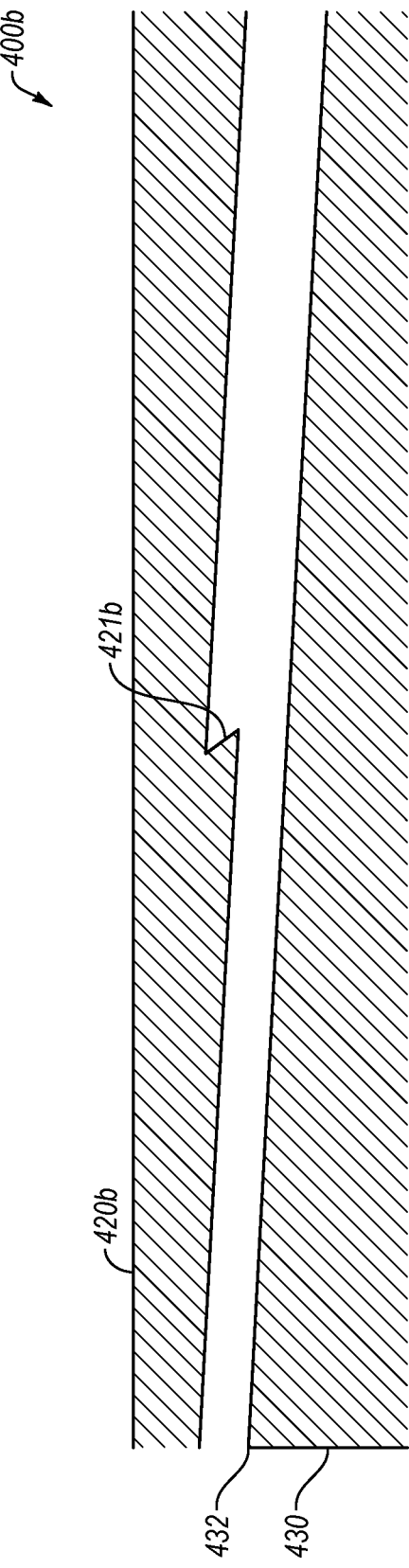

FIGS. 4A and 4B illustrate a cut away view of fingers 420a/420b and a core 430 of an example torque tube coupler 400a/400b. The torque tube coupler 400a/400b may be similar or comparable to the torque tube couplers of FIGS. 1A-3B. For example, the fingers 420a/420b may be similar or comparable to the fingers 120/121, 220, and/or 320/321, and the core 430 may be similar or comparable to the cores 130 and/or 330/331. The torque tube couplers 400a/400b may illustrate one approach to preventing the core 430 from back-sliding after being drawn inwards.

As illustrated in FIG. 4A, the finger 420a may include teeth 421a and 422 along the inside surface of the finger 420a. Using the teeth 421a/422, as the core 430 is drawn inwards, an outside lip 432 of the core 430 may pass the tooth 421a and be prevented from sliding back past the tooth 421a. As the core 430 is drawn further inwards, the lip 432 may pass the tooth 422, preventing the core 430 from sliding back past the tooth 422. By providing the teeth 421a and/or 422, the action of the lip 432 and the teeth 421a/422 may act as a ratcheting mechanism to prevent the core 430 from sliding back outwards. While two teeth are shown in FIG. 4A, any number of teeth may be used in any configuration. Additionally, any shape or profile of the teeth are contemplated as within the scope of the present disclosure. Additionally or alternatively, the surface of the core 430 that interfaces with the finger 420a may include steps or other similar features to more directly interface with the teeth 421a/422 to better lock the core 430 from sliding back outwards.

As illustrated in FIG. 4B, a single tooth 421b may be used. In these and other embodiments, the single tooth 421b may be placed at a position along the length of the finger 420b to correspond to a position in which the core 430 has forced the finger 420b radially outwards enough to sufficiently lock the torque tube in place relative to the torque tube coupler 400b. By providing the single tooth 421b, an installer may be able to draw the core 430 inwards until they hear or feel the click of the lip 432 passing the tooth 421b and know that the torque tube coupler 400b has been installed properly.

As illustrated in FIG. 4B, the tooth 421b may be positioned in such a way that the finger 420b continues to maintain a profile in which the finger 420b has a narrower thickness near the central ring than at the far end.

Figure 5:
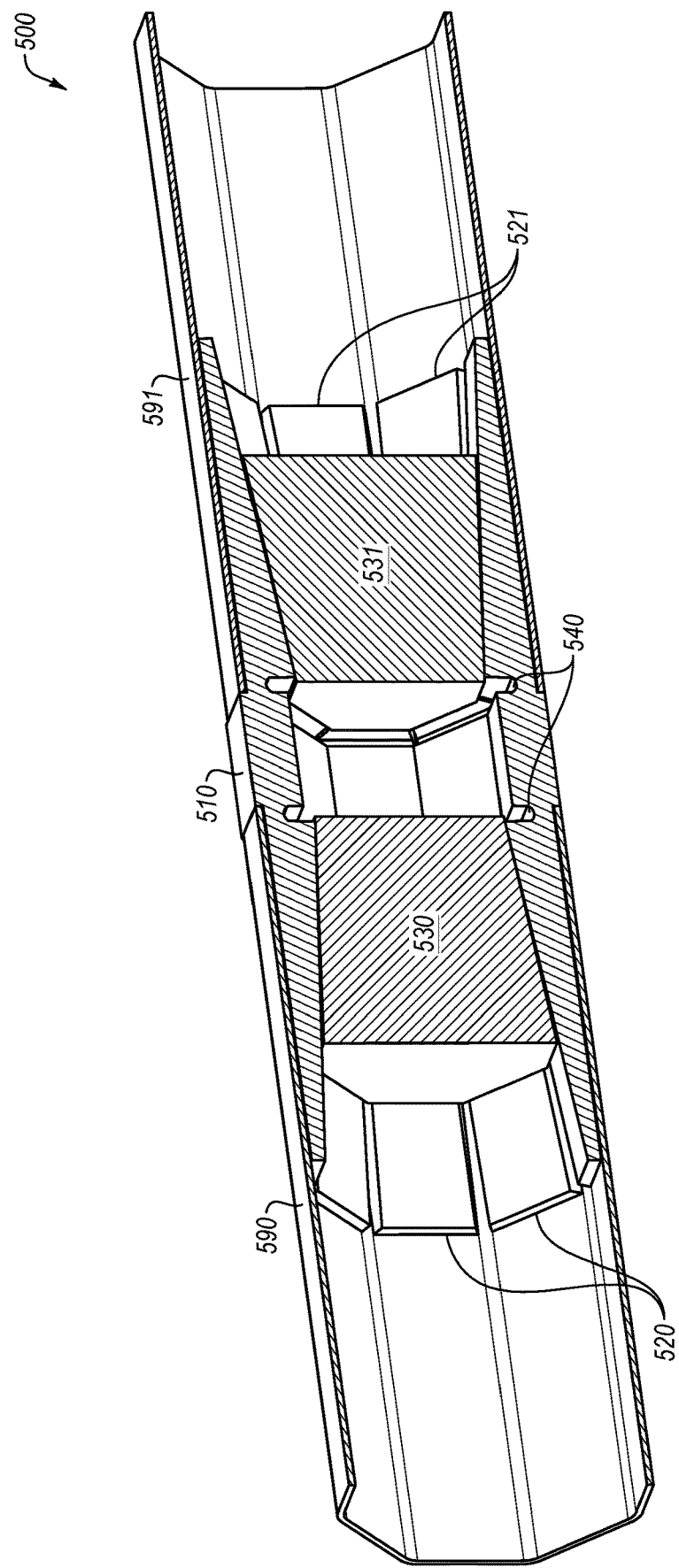
FIG. 5 is a cut away view of an example torque tube coupler disposed within two adjacent torque tubes.

FIG. 5 is a cut away view of an example torque tube coupler 500 disposed within adjacent torque tubes 590 and 591. The torque tube coupler 500 may be similar or comparable to the torque tube couplers of any of FIGS. 1A-4B. For example, the central ring 510 may be similar or comparable to the central ring 110, 210, and/or 310, the fingers 520/521 may be similar or comparable to the fingers 120/121, 220, 320/321, and/or 420, and the core 530 may be similar or comparable to the cores 130, 330/331, and/or 430, and the flexion grooves 540 may be similar or comparable to the flexion grooves 340.

FIG. 6 illustrates another example embodiment of a torque tube coupler 600, in accordance with one or more embodiments of the present disclosure. The torque tube coupler 600 may attach via a frictional fit between an outside surface of a flange 620 with an inside surface of a torque tube 690/691 (such as the flange 620a with the torque tube 690 and the flange 620b with the torque tube 691).

The torque tube coupler 600 may include a central ring 610 that may be sized approximately to match an outer dimension of the torque tubes 690/691. The flanges 620a/620b may be sized to approximately the same or slightly larger than an inner dimension of the torque tubes 690/691 such that the flanges 620a/620b of the torque tube coupler 600 may be forced within each of the torque tubes 690/691.

In some embodiments, the flanges 620 may include a tapered region 622 (such as the tapered regions 622a/622b) to facilitate the flange 620 starting to be forced within the torque tube 690/691 and aligned within the torque tube 690/691.

In some embodiments, the outer surface of the flange 620 may include a surface treatment 624. For example, the surface treatment may include embossing, etching, roughing, etc. to the outside surface of the flange 620 to increase the friction between the outside surface of the flange 620 to prevent the torque tube coupler 600 from coming apart when joining the torque tubes 690 and 691.

In some embodiments, after the torque tube coupler 600 has been installed (e.g., press-fit into each of the adjacent torque tubes 690/691), a locking feature may be applied to the torque tube coupler 600 and the torque tube 690/691. For example, a set screw may be driven through the torque tube 690 and into the flange 620a. In these and other embodiments, the set screw may or may not be shaped and positioned such that it does not extend beyond an outer dimension of the torque tube 690. As another example of the locking feature, an external clamp may be tightened around the torque tube 690 and the flange 620a to compress the torque tube 690 against the surface treatment more effectively.

In some embodiments, the flange 620 may be provided with walls thick enough to prevent deformation over time when forced within the torque tube 690/691. Additionally, the length of the flange 620 may vary and/or be dictated by the amount of friction needed to prevent the torque tube coupler 600 from sliding out. As the length of the flange 620 increases, there may be an increase material cost and increased effort/force required to press the flange 620 into the torque tube 690/691, but the increased length makes it more likely the torque tube coupler 600 will remain in place after installation.

Figure 7A:
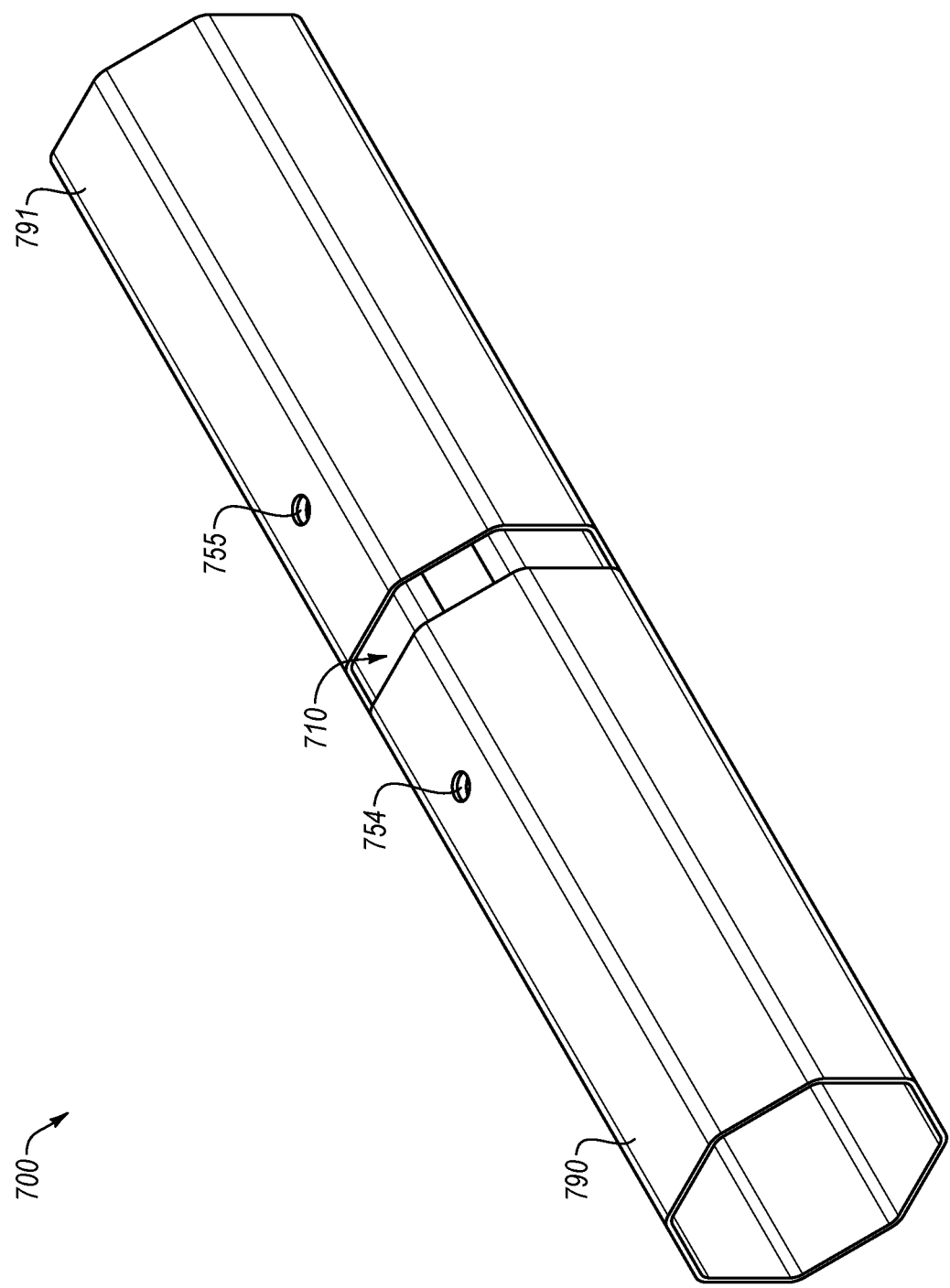
FIGS. 7A and 7B illustrate an additional example embodiment of a torque tube coupler.
Figure 7B:
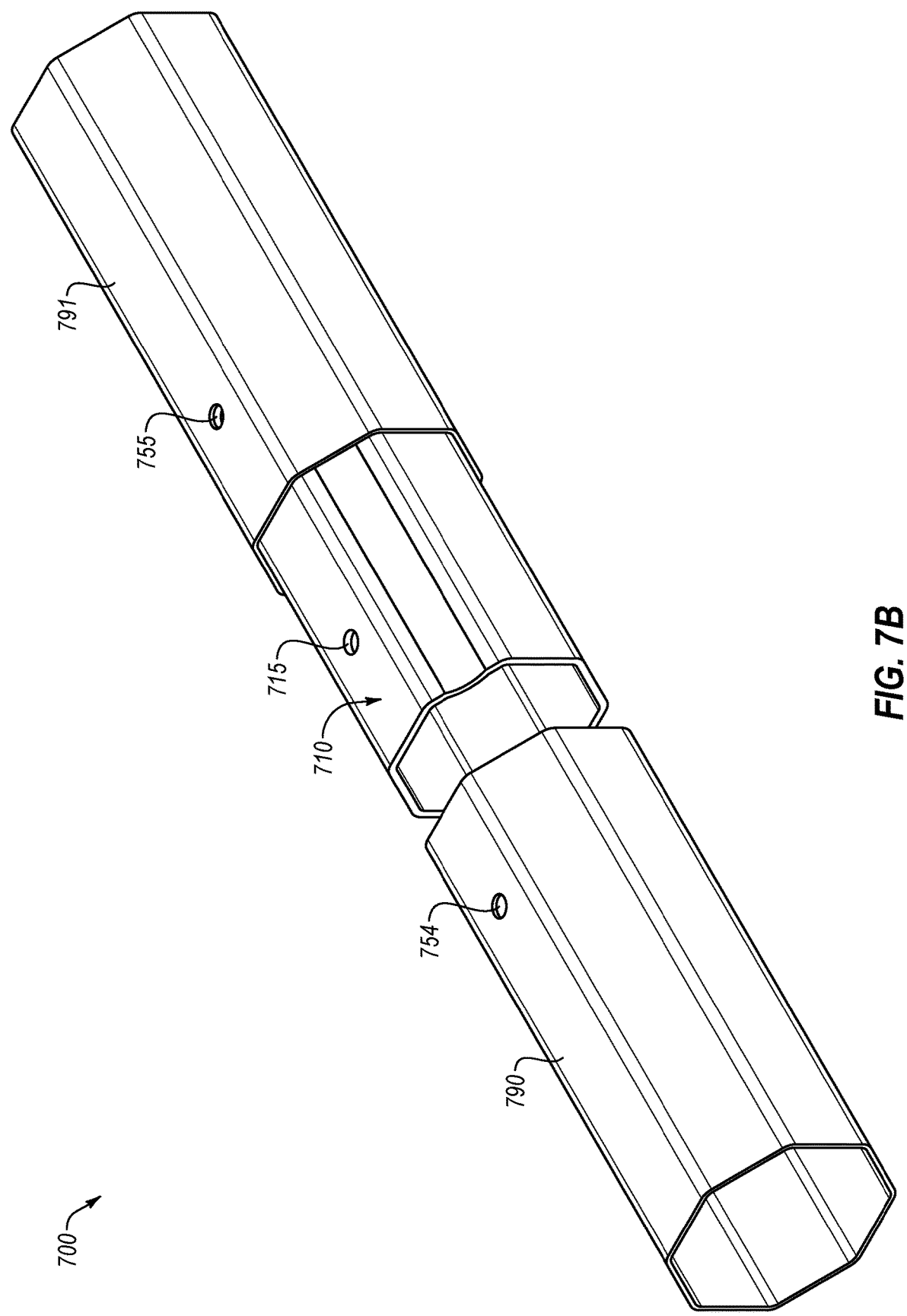

FIGS. 7A and 7B illustrate an additional example embodiment of a torque tube coupler 700. The torque tube coupler 700 may be shaped and configured to be disposed within two adjacent torque tubes 790 and 701. On a top face 710 of the torque tube coupler 700, the torque tube coupler 700 may include a bolt hole 715 and a corresponding hole 754 may be located in a top face of the torque tube 790. The torque tube 791 may also include a corresponding hole 755 to a second bolt hole (not shown) of the torque tube coupler 700.

After being disposed within the two adjacent torque tubes 790/791, bolts, screws, etc. may be used to fixedly couple the torque tubes 790/791 to the torque tube coupler.

In some embodiments, the torque tube coupler 700 may have a shape that matches the shape of the torque tubes 790/791. In some embodiments, one or more of the faces corresponding to the faces of the torque tube may be curved or otherwise offset from the torque tubes 790/791 to facilitate easier insertion into the torque tubes 790/791 and/or to increase the material strength of the torque tube coupler 700. For example, as illustrated in FIG. 7B, the face adjacent to the top face 710 may curve inwardly rather than being flat like the profile of the torque tubes 790/791.

Figure 8:
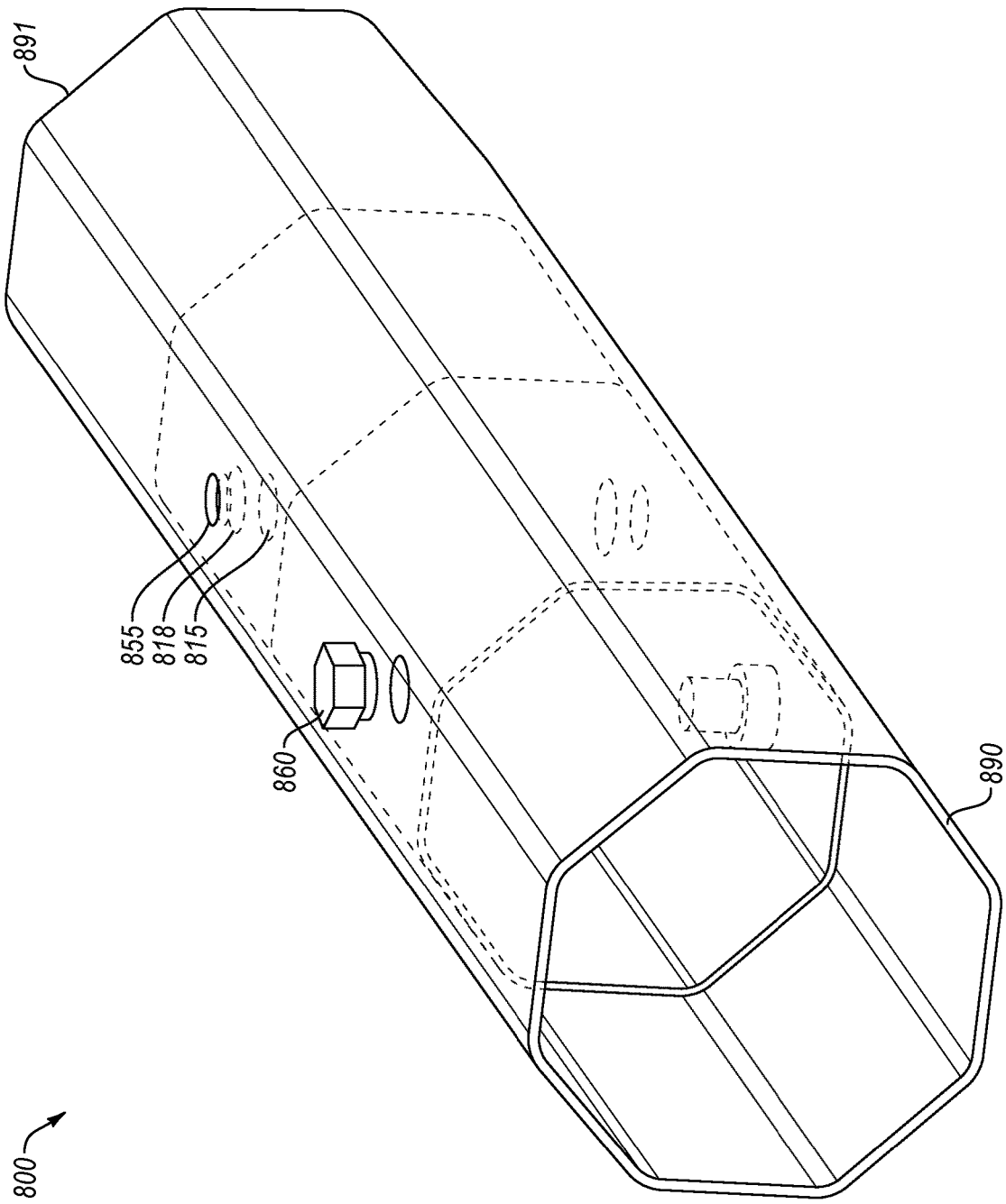
FIG. 8 illustrates another example embodiment of a torque tube coupler.

FIG. 8 illustrates another example embodiment of a torque tube coupler 800, in accordance with one or more embodiments of the present disclosure. The torque tube coupler may be similar or comparable to the torque tube coupler 700 illustrated in FIGS. 7A and 7B. The torque tube coupler 800 of FIG. 8 may include multiple bolt holes, such as the bolt holes 815 and 818 that may facilitate use of the torque tube coupler 800 with different sized, arranged, etc. torque tube segments 890/891 with different positions of corresponding holes (such as the hole 855) in the adjacent torque tube segments 890/891. For example a bolt 860 may be shaped to fit through a hole 855 in the torque tube 891 and the corresponding hole 818 in the torque tube coupler 800.

Figure 9A:
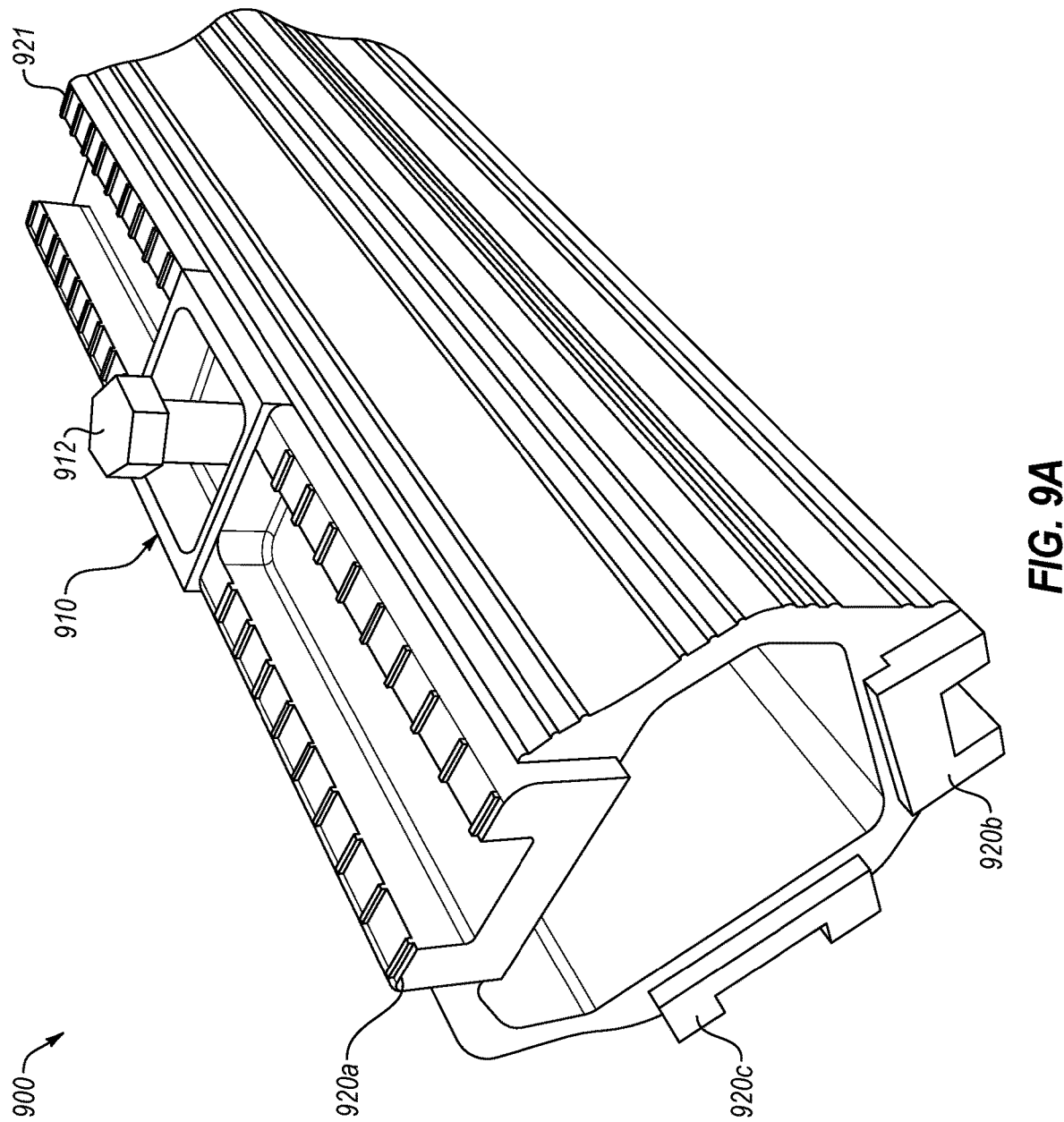
FIGS. 9A and 9B illustrate an additional example embodiment of a torque tube coupler.
Figure 9B:
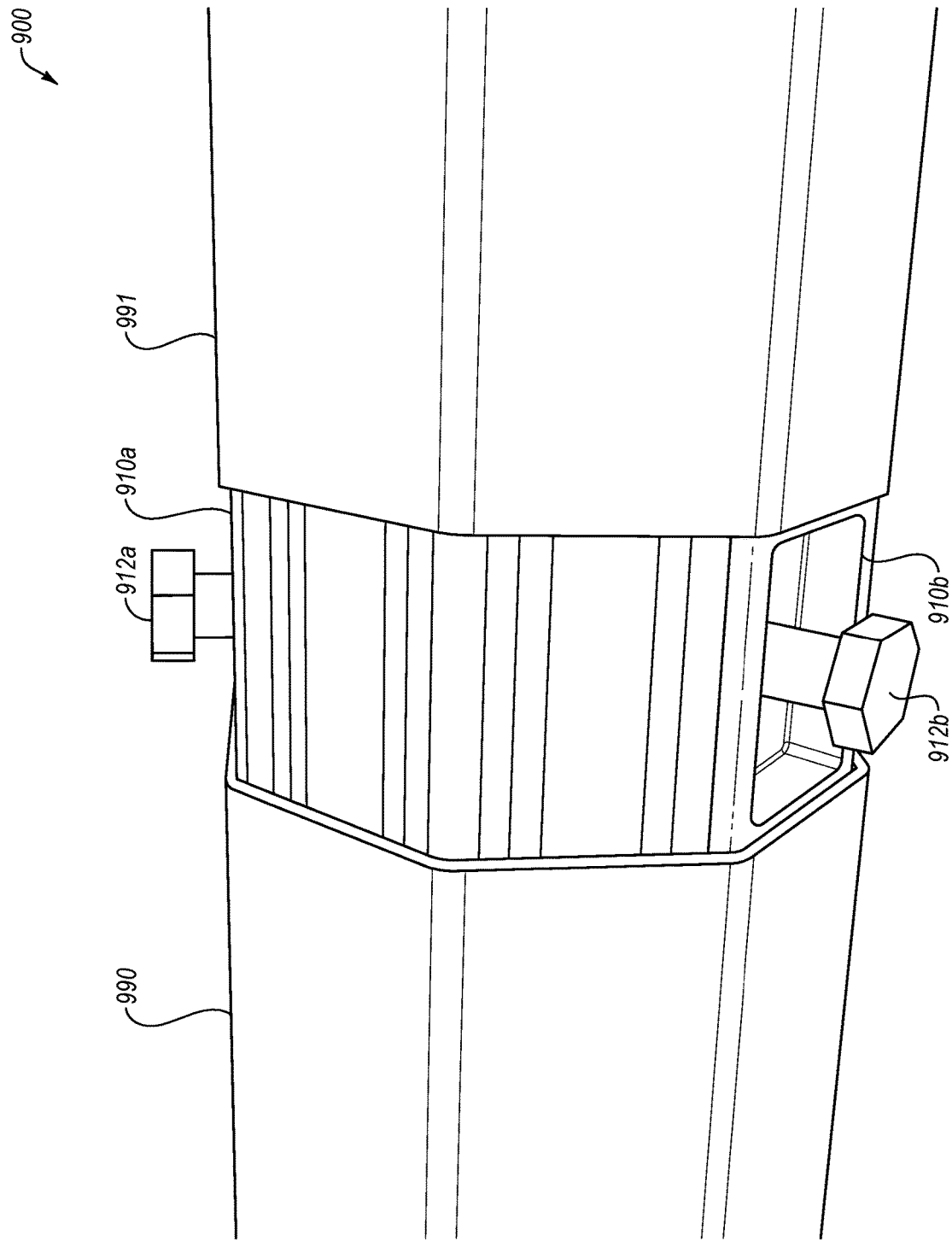

FIGS. 9A and 9B illustrate an additional example embodiment of a torque tube coupler 900, in accordance with one or more embodiments of the present disclosure. The torque tube coupler 900 may include arms 920 (such as the arms 920a, 920b and 920c) at one end of the torque tube coupler 900, and similar arms 921 at the opposite end. The torque tube coupler 900 may be shaped to fit within two adjacent torque tubes 990/991.

When placed within the torque tubes 990/991, a bolt 912 within a bracket 910 may be tightened. As the bolt 912 is tightened, the arms 920 and 921a may be forced radially outward at the far end. For example, in a lever-type action, the bracket 910 being forced radially inward by the bolt 912 may force a middle end of the arm downward with the bracket, causing the far end of the arm 920 to extend radially outward. By extending radially outward, the arm 920 may lock the torque tube coupler 900 and the torque tubes 990/991 in place relative to each other. In some embodiments, the positioning and size of the bracket 910 and/or the bolt 912 may be arranged such that after being fully tightened, the bolt 912 and/or the bracket 910 may sit flush with or below an outer dimension of the torque tubes 990/991.

As illustrated in FIG. 9B, the torque tube coupler 900 may include multiple brackets 910a/910b with respective bolts 912a/912b spaced around the periphery of the torque tube coupler 900 such that multiple arms (such as the arms 920a/920b/920c) may all be pushed radially outward, thereby increasing the frictional force with the torque tubes 990/991.

In some embodiments, the arms 920 may include a texture, coating, surface treatment, etc. to increase the frictional force between the arms 920 and the torque tubes 990/991.

Figure 10A:
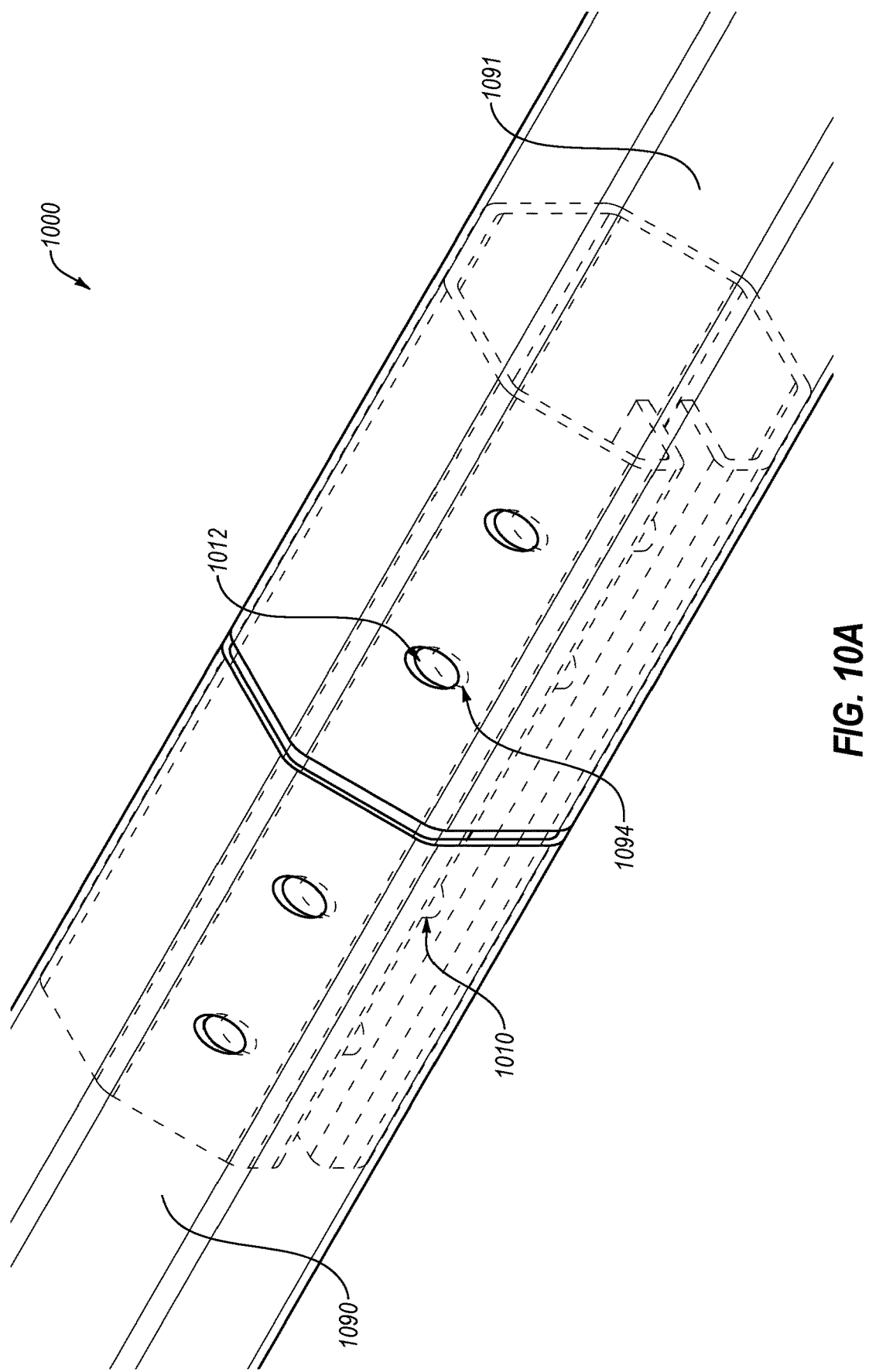
FIGS. 10A and 10B illustrate another example embodiment of a torque tube coupler.
Figure 10B:
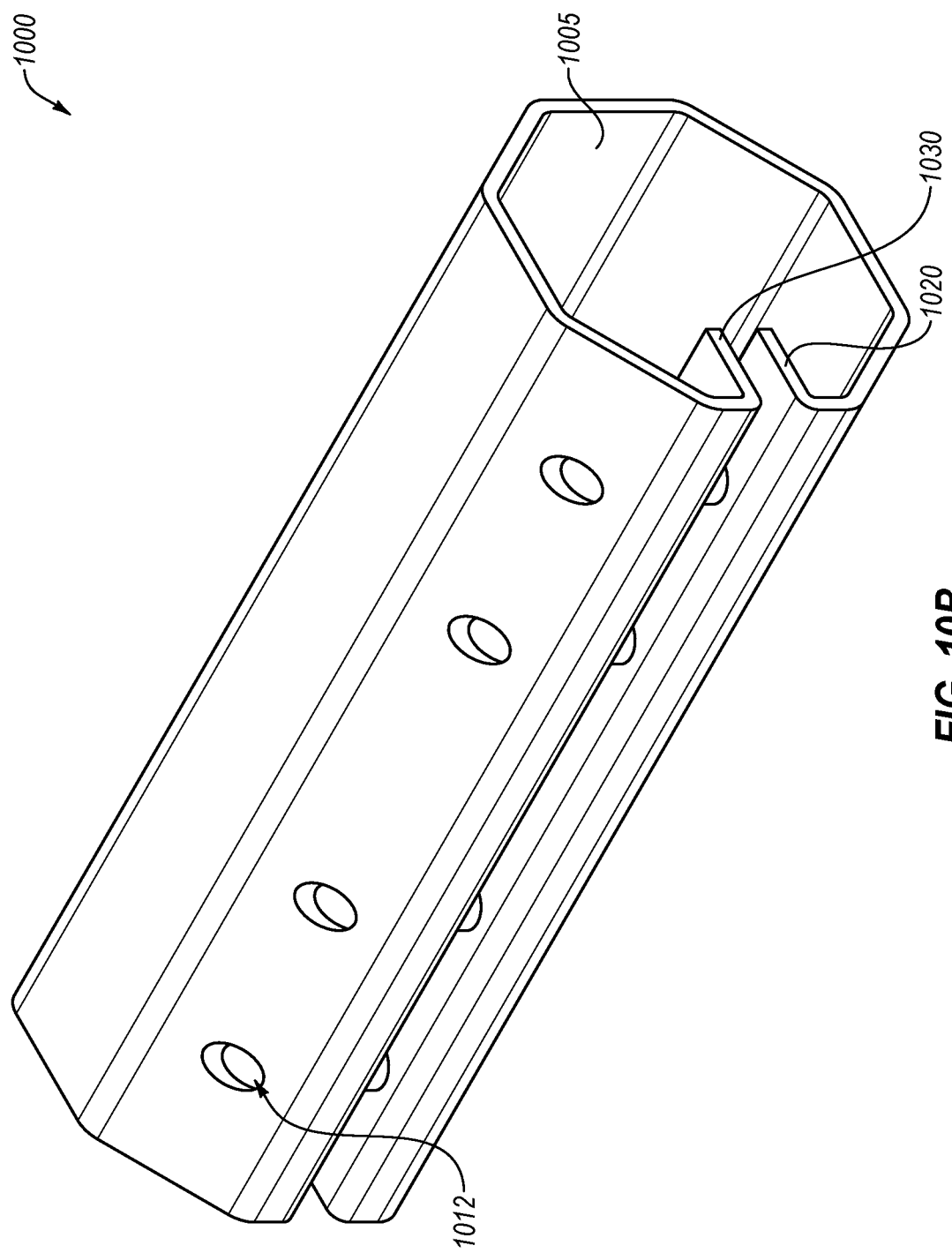

FIGS. 10A and 10B illustrate an additional example embodiment of a torque tube coupler 1000, in accordance with one or more embodiments of the present disclosure. The torque tube coupler 1000 may include first and second abutting surfaces 1020 and 1030 coupled to an outer body 1005 of the torque tube coupler through which one or more set screws 1010 may pass. The first and second abutting surfaces 1020 and 1030 and the outer body 1005 may be one continuous piece of material, such as a stamped and/or roll-formed piece of metal. The torque tube coupler 1000 may be shaped to fit within two adjacent torque tubes 1090/1091.

The torque tube coupler 1000 may include channels 1012 within which the set screws 1010 are disposed, and the torque tubes 1090/1091 may include corresponding holes 1094 that align with the channels 1012 via which the set screws 1010 may be accessed when disposed within the torque tubes 1090/1091. For example, as illustrated in FIG. 10A, the holes 1094 are aligned with the channels 1012 such that the heads of the set screws 1010 are accessible below the outer surface of the torque tubes 1090/1091 even when the torque tube coupler 1000 is disposed within the torque tubes 1090/1091.

In some embodiments, the set screw 1010 may be capped or otherwise have a locking feature to keep the set screw 1010 in place relative to one of the abutting surfaces 1020 and 1030. Additionally or alternatively, the torque tube coupler 1000 may include a lip or shelf proximate the opening of the channel 1012 to keep the set screw 1010 from extending out from the channel 1012. In these and other embodiments, the first abutting surface 1020 may be threaded while the second abutting surface 1030 may be a solid surface against which the set screw 1010 may be pushed. By keeping the set screw 1010 from moving relative to the channel 1012 and the second abutting surface 1030, as the set screw 1010 is turned, the threaded first abutting surface 1020 is effectively moved along the length of the set screw.

In some embodiments, the fixation of the set screw 1010 may be arranged such that the first threaded abutting surface 1020 is forced upwards when the set screws 1010 are turned, but are not prevented from being lifted up by other set screws 1010. For example, because the set screws 1010 are resting against the second abutting surface 1030, as one of the four set screws 1010 illustrated in FIG. 10A are tightened, the first abutting surface 1020 is spread further away from the second abutting surface 1030. The three other set screws 1010 may be lifted up and away from the surface of the second abutting surface 1030, and may be tightened in turn to further force the first abutting surface 1020 away from the second abutting surface 1030, or to provide greater stability or greater outward force to the torque tube coupler 1000.

In operation, the torque tube coupler 1000 may be inserted within two adjacent torque tubes 1090/1091 such that the channels 1012 are aligned with the holes 1094. The set screws 1010 may then be tightened, forcing the first abutting surface 1020 away from the second abutting surface 1030. By forcing the two abutting surfaces 1020/1030 apart, an outward force may be applied to the inside surface of the torque tubes 1090/1091. The set screws 1010 may be tightened until a sufficient outward force is applied to the torque tubes 1090/1091 to lock the torque tubes 1090/1091 into place relative to each other. In some embodiments, the outer body 1005 may include one or more ratcheting mechanisms, such as inside one or more of the channels 1012 of the first abutting surface 1020, in which the ratcheting mechanism is configured to allow expansion movement of the first abutting surface 1020 away from the second abutting surface 1030 and prevent retracting movement of the first abutting surface 1020 towards the second abutting surface 1030. Additionally or alternatively, the ratcheting mechanism may make a snapping, popping, and/or any other noise in response to the first abutting surface 1020 being forced a predetermined distance away from the second abutting surface 1030, which may inform an installer or otherwise provide a perceptible indication that the outer body 1005 of the torque tube coupler 1000 has expanded a sufficient distance to resist movement of the torque tubes 1090/1091 relative to one another and/or with the torque tube coupler 1000.

In some embodiments, an outer surface of the outer body 1005 may include one or more features for resisting movement of the torque tubes 1090/1091 relative to the torque tube coupler 1000. For example, the outer surface may be etched or roughed to create additional friction. As another example, barbs, hooks, or protrusions pointing outwards from where the two torque tubes 1090/1091 join (as illustrated in FIG. 10A) may be disposed on the outer surface of the torque tube coupler 1010.

While the use of the set screw 1010 is described, any mechanism that is accessible from outside of the torque tubes 1090/1091 may be used that forces the two abutting surfaces 1020/1030 apart.

Figure 10C:
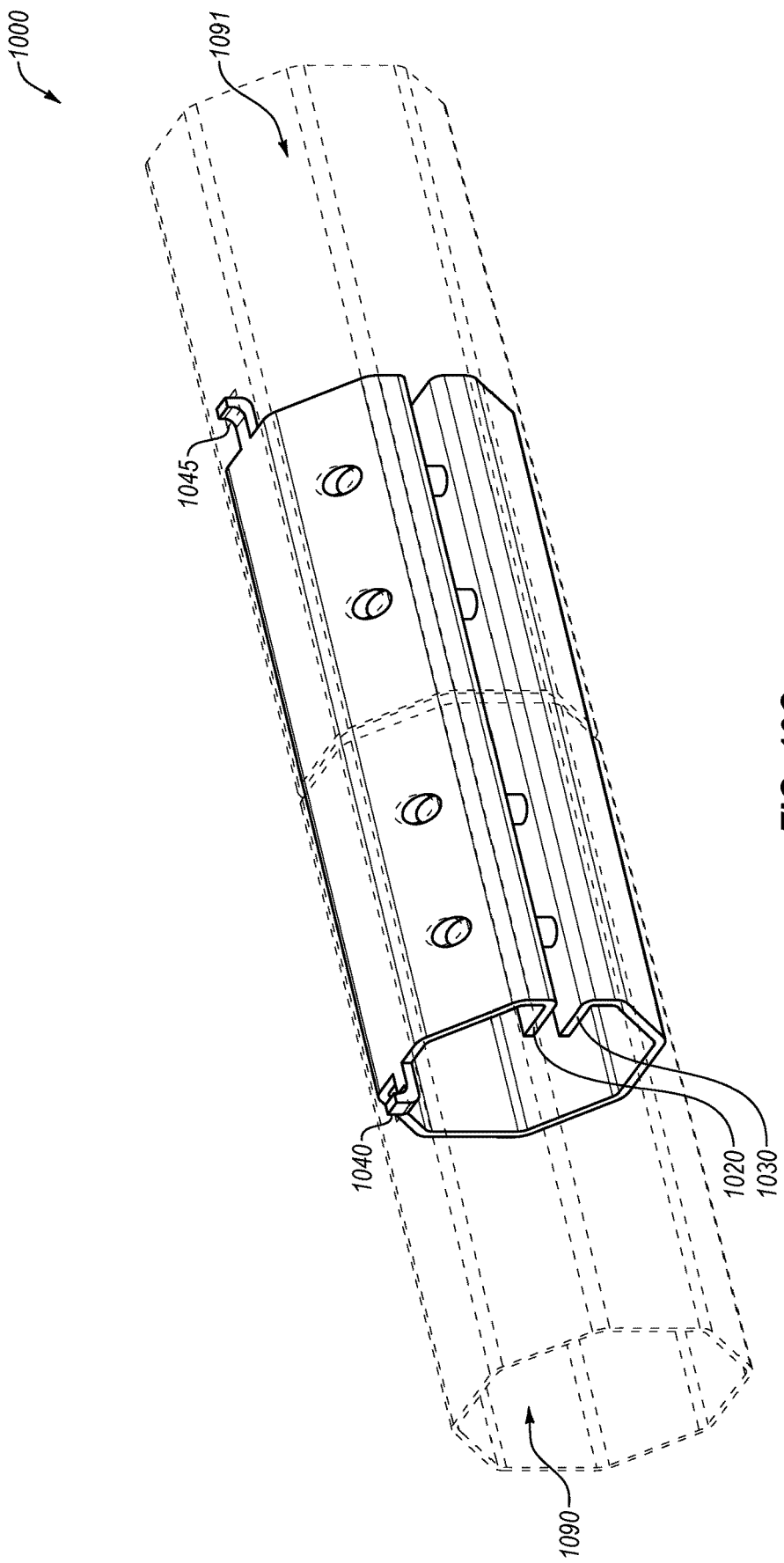
FIG. 10C illustrates an additional example embodiment of a torque tube coupler.

FIG. 10C illustrates an additional example embodiment of the torque tube coupler 1000, in accordance with one or more embodiments of the present disclosure. In some embodiments, the outer body 1005 may include a tab 1040 and/or a slot 1045 through which the tab 1040 may interface. The tab 1040 interfacing with the slot 1045 may provide a mechanical interaction that prevents movement of the torque tube coupler 1000 and/or the torque tube 1090/1091 after the first abutting surface 1020 is forced a predetermined distance away from the second abutting surface 1030. While illustrated as the torque tube 1090/1091 including the slot 1045 and the outer body 1005 including the tabs 1040, it will be appreciated that they could be reversed such that the torque tube 1090/1091 includes the tabs 1040 and the outer body 1005 includes the tabs 1045.

In some embodiments, the feature of a tab and/or slot may be included in the other embodiments of the present disclosure. For example, the fingers 120/121 of FIGS. 1A/1B may include tabs at the distal end of the fingers with the tabs corresponding to slots in the torque tube segments to facilitate a mechanical locking of the fingers relative to the torque tube segments. As another example, the arms 920-921 of FIGS. 9A/9B may include tabs at the distal ends of the arms 920-921 with tabs corresponding to the slots of the torque tube segments, and/or a surface of the bracket 910 and/or the bolt 912 of FIGS. 9A/9B that are positioned flush against the torque tube segments may include tabs corresponding to the slots of the torque tube segments.

In some embodiments, a portion of the first abutting surface 1020 (e.g., an end of the first abutting surface 1020) may be angled towards the second abutting surface 1030. In these and other embodiments, the angled portion of the first abutting surface 1020 may be configured to touch the second abutting surface 1030 such that the first abutting surface 1020 may take a larger load as the set screws 1010 are tightened and the torque tube coupler 1000 expands.

Modifications, additions, or omissions may be made to any of FIGS. 1A-10B of the present disclosure. For example, changes as described herein may be made in accordance with the knowledge of a person of ordinary skill in the art. For example, the torque tube couplers may take different forms, with different numbers and orientations of components such as fingers, etc.

The subject technology of the present disclosure is illustrated, for example, according to various aspects described below. Various examples of aspects of the subject technology are described as numbered examples (1, 2, 3, etc.) for convenience. These are provided as examples and do not limit the subject technology. It is noted that any of the dependent examples or portions thereof may be combined in any combination, and placed into an independent example, e.g., Examples 1, 2, and 3. The other examples can be presented in a similar manner. The following is a non-limiting summary of some examples presented herein.

Example 1 includes a torque tube coupler that may include an outer body, a first abutting surface coupled to the outer body and including one or more channels, a second abutting surface adjacent to the first abutting surface, and one or more set screws sized for insertion into the one or more channels of the first abutting surface. Tightening one or more of the set screws may force the first abutting surface away from the second abutting surface to press the outer body against an inner surface of a torque tube.

In some examples, the torque tube coupler may further comprise a locking feature configured to keep each of the set screws in place relative to the first abutting surface or the second abutting surface.

In some examples, an outer surface of the torque tube coupler may include an etched or roughed texture capable of increasing a frictional force exerted on an interior surface of a torque tube in which the torque tube coupler is inserted.

In some examples, the torque tube coupler may further comprise a lip proximate an opening of each of the channels of the first abutting surface, wherein the lips are configured to prevent the set screws inserted through the channels from extending out of the channels.

In some examples, the outer body of the torque tube coupler may include a tab extending towards the torque tube in which the outer body is shaped to extend through a slot in the torque tube. The tab may interface with the slot to provide a mechanical force that reduces movement of the outer body relative to the torque tube.

Example 2 includes a torque tube coupler that may include a central ring sized to correspond with an outer dimension of a torque tube. The torque tube coupler may include a first set of fingers including one or more first fingers extending away from a first side of the central ring in which each first finger is attached to the central ring at a middle end and is shaped to flex radially outward at a far end. The torque tube coupler may also include a first core disposed within the first fingers and angled such that as the first core is in an outer position, the first fingers fit within an inner dimension of the torque tube, and when drawn inwards towards the central ring, the first fingers are caused to flex radially outwards away from the first core.

In some examples, the torque tube coupler may include a second set of fingers including one or more second fingers that extend away from a second side of the central ring in a direction opposite to the direction in which the first fingers extend away from the first side of the central ring. Each second finger may be attached to the central ring at a middle end and shaped to flex radially outward at a far end. A second core may be disposed within the second fingers and angled such that as the second core is in an outer position, the second fingers fit within an inner dimension of the torque tube, and when drawn inwards towards the central ring, the second fingers flex radially outwards away from the second core.

In some examples, the torque tube coupler may include a bolt disposed below a flat face of the central ring that extends into a middle of the central ring. The torque tube coupler may include a coupling mechanism including at least one of: a cord, a string, a ratchet mechanism, or a zip-tie mechanism that is coupled between the bolt and the first core in which tightening the bolt causes the coupling mechanism to draw the first core inwards towards the central ring.

In some examples, one or more of the first fingers may include a surface treatment that includes a roughing agent applied to outer surfaces of the first fingers or a plurality of barbs disposed on the outer surfaces of the first fingers.

In some examples, one or more locations along the torque tube coupler may include a plurality of flexion grooves having decreased material thickness relative to the material thickness of the rest of the torque tube coupler.

In some examples, the torque tube coupler may include a coupling bolt that projects from an outer surface of the central ring into a hollow region within the central ring in which the coupling bolt includes one or more cords connecting the first core to the coupling bolt such that tightening the coupling bolt draws the first core inwards towards the central ring.

In some examples, the cords connecting the first core to the coupling bolt may include a preset tensile strength such that the cords experience material failure in response to the first core being drawn a predetermined distance towards the central ring.

In some examples, the coupling bolt or the cords may include a one-way ratcheting mechanism that prevents the first core from being drawn in a direction away from the central ring.

In some examples, an inner surface of each of the first fingers that interfaces with an outer surface of the first core may include one or more teeth shaped to prevent movement of the first core in a direction away from the central ring.

In some examples, the torque tube coupler may include a tab on the far end of at least one of the first fingers corresponding to a slot in the torque tube.

Example 3 includes a power-generating system that may include a plurality of photovoltaic modules and a mounting system connecting each photovoltaic module of the plurality of photovoltaic modules. The mounting system may include one or more torque tube segments connected by a torque tube coupler. The torque tube coupler may include an outer body, a first abutting surface coupled to the outer body and including one or more channels, a second abutting surface adjacent to the first abutting surface, and one or more set screws sized for insertion into the one or more channels of the first abutting surface. Tightening one or more of the set screws may force the first abutting surface away from the second abutting surface to press the outer body against an inner surface of a torque tube.

In some examples, the torque tube coupler of the power-generating system may include a locking feature configured to keep each of the set screws in place relative to the first abutting surface or the second abutting surface.

In some examples, an outer surface of the torque tube coupler includes an etched or roughed texture capable of increasing a frictional force exerted on an interior surface of a torque tube in which the torque tube coupler is inserted.

In some examples, the torque tube coupler of the power-generating system may include a lip proximate an opening of each of the channels of the first abutting surface, wherein the lips are configured to prevent the set screws inserted through the channels from extending out of the channels.

In some examples, the outer body may include a tab extending towards the torque tube and is shaped to extend through a slot in the torque tub. The tab may interface with the slot to provide a mechanical force that reduces movement of the outer body relative to the torque tube.

The various features illustrated in the drawings may be, but are not necessarily, drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Relative terms used in the present disclosure and especially in the appended claims (e.g., bodies of the appended claims) are generally intended as falling within manufacturing tolerances and/or within scope reasonably understood by a person of skill in the art. For example, if two components are identified as being the "same" size, there may be variations consistent with manufacturing variances. Terms describing "approximately," "similar," "substantially," or other terms designating similarity may convey within ten percent of the comparative value. For example, two components that are approximately the same size would be understood to be of a size within ten percent of each other.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A torque tube coupler, comprising:
an elongated outer body including an aperture that runs an entire length of the outer body;
a first abutting surface coupled to the outer body and defining a first side of the aperture, the first abutting surface including one or more channels;
a second abutting surface coupled to the outer body and defining a second side of the aperture; and
one or more set screws sized for insertion into the one or more channels of the first abutting surface,
wherein tightening one or more of the set screws forces the first abutting surface away from the second abutting surface expanding a distance between the first abutting surface and the second abutting surface, and wherein the first abutting surface, the second abutting surface, and the outer body are a single continuous piece of material.

2. The torque tube coupler of claim 1, wherein an outer surface of the torque tube coupler includes an etched or roughed texture capable of increasing a frictional force exerted on an interior surface of a torque tube in which the torque tube coupler is inserted.

3. The torque tube coupler of claim 1, wherein:
the outer body includes a tab configured to extend towards a torque tube and is shaped to extend through a slot in the torque tube.

4. The torque tube coupler of claim 1, wherein the torque tube coupler is substantially hollow.

5. A power-generating system, comprising:
a plurality of photovoltaic modules; and
a mounting system connecting each photovoltaic module of the plurality of photovoltaic modules, wherein the mounting system includes a first torque tube segment and a second torque tube segment connected by a torque tube coupler, the torque tube coupler comprising:
an elongated outer body including an aperture that runs an entire length of the outer body;
a first abutting surface coupled to the outer body and defining a first side of the aperture, the first abutting surface including one or more channels;
a second abutting surface coupled to the outer body and defining a second side of the aperture; and
one or more set screws sized for insertion into the one or more channels of the first abutting surface,
wherein tightening one or more of the set screws forces the first abutting surface away from the second abutting surface expanding a distance between the first abutting surface and the second abutting surface, and wherein the first abutting surface, the second abutting surface, and the outer body are a single continuous piece of material.

6. The system of claim 5, wherein an outer surface of the torque tube coupler includes an etched or roughed texture capable of increasing a frictional force exerted on an interior surface of a torque tube in which the torque tube coupler is inserted.

7. The system of claim 5, wherein:
the outer body of the torque tube coupler includes a first tab that extends towards the first torque tube segment and is shaped to extend through a first slot in the first torque tube segment.

8. The system of claim 7, wherein:
the outer body of the torque tube coupler includes a second tab that extends towards the second torque tube segment and is shaped to extend through a second slot in the second torque tube segment.

9. The system of claim 5, wherein the torque tube coupler is substantially hollow.

* * * * *